United States Patent
Burd

(10) Patent No.: US 10,337,455 B2
(45) Date of Patent: Jul. 2, 2019

(54) FAN NACELLE INLET FLOW CONTROL

(71) Applicant: United Technologies Corporation, Farmington, CT (US)

(72) Inventor: Steven W. Burd, Cheshire, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 212 days.

(21) Appl. No.: 15/105,117

(22) PCT Filed: Dec. 12, 2014

(86) PCT No.: PCT/US2014/070039
§ 371 (c)(1),
(2) Date: Jun. 16, 2016

(87) PCT Pub. No.: WO2015/130384
PCT Pub. Date: Sep. 3, 2015

(65) Prior Publication Data
US 2016/0312741 A1    Oct. 27, 2016

Related U.S. Application Data

(60) Provisional application No. 61/916,387, filed on Dec. 16, 2013.

(51) Int. Cl.
*F02K 3/075* (2006.01)
*F02K 3/06* (2006.01)
(Continued)

(52) U.S. Cl.
CPC ............ *F02K 3/075* (2013.01); *F01D 25/02* (2013.01); *F02C 3/04* (2013.01); *F02C 7/047* (2013.01);
(Continued)

(58) Field of Classification Search
CPC .... F02C 7/04; F05D 2270/17; F05D 2250/71; F05D 2250/324; B64D 33/02; B64D 29/00; B64C 21/06
See application file for complete search history.

(56) References Cited

U.S. PATENT DOCUMENTS 3,449,891 A * 6/1969 Amelio ................ B64D 33/02
244/53 B
4,132,240 A * 1/1979 Frantz .................. B64D 33/02
137/15.1
(Continued)

FOREIGN PATENT DOCUMENTS

EP    2434095 A2    3/2012

OTHER PUBLICATIONS

Notification of Transmittal of the International Search Report of the International Searching Authority, or the Declaration; PCT/US2014/070039; dated Sep. 11, 2015. 4 pages.
(Continued)

*Primary Examiner* — Craig Kim
(74) *Attorney, Agent, or Firm* — Cantor Colburn LLP

(57) ABSTRACT

The present disclosure relates generally to a system for fan nacelle inlet flow control in a gas turbine engine, the nacelle comprising a nacelle inlet cowl including an inlet lip disposed at a leading edge of the nacelle inlet cowl, an inner surface extending aft from the inlet lip, and an outer surface extending aft from the inlet lip and positioned radially outward of the inner surface; and at least one flow control passage extending through the nacelle inlet cowl, each of the at least one flow control passage including a flow control passage inlet, disposed on the inlet lip, and a flow control passage outlet; wherein air may flow into the flow control passage inlet, through the flow control passage, and exits the flow control passage outlet.

18 Claims, 4 Drawing Sheets

(51) Int. Cl.
*F02C 7/047* (2006.01)
*F02C 7/057* (2006.01)
*F01D 25/02* (2006.01)
*F02C 3/04* (2006.01)
*F04D 29/52* (2006.01)
*F04D 29/54* (2006.01)

(52) U.S. Cl.
CPC ............... *F02C 7/057* (2013.01); *F02K 3/06* (2013.01); *F04D 29/522* (2013.01); *F04D 29/541* (2013.01); *F05D 2220/323* (2013.01); *F05D 2240/35* (2013.01); *F05D 2270/17* (2013.01)

(56) References Cited

U.S. PATENT DOCUMENTS

| | | | |
|---|---|---|---|
| 4,482,114 A | 11/1984 | Gupta et al. | |
| 5,141,182 A | 8/1992 | Coffinberry | |
| 5,297,765 A | 3/1994 | Hughes et al. | |
| 6,216,982 B1 | 4/2001 | Pfennig et al. | |
| 6,698,691 B2* | 3/2004 | Porte | B64D 15/04 244/134 B |
| 7,048,230 B2* | 5/2006 | Meyer | B64D 33/02 244/130 |
| 8,529,188 B2 | 9/2013 | Winter | |
| 2008/0112799 A1 | 5/2008 | Winter et al. | |
| 2009/0060704 A1 | 3/2009 | Hurwitz et al. | |
| 2009/0121083 A1* | 5/2009 | Jain | B64D 29/00 244/130 |
| 2009/0155046 A1 | 6/2009 | Haas | |
| 2009/0301095 A1 | 12/2009 | Zysman et al. | |
| 2012/0255274 A1 | 10/2012 | Hummel et al. | |

OTHER PUBLICATIONS

Notification of Transmittal of the Written Opinion of the International Searching Authority, or the Declaration; PCT/US2014/070039; dated Sep. 11, 2015. 9 pages.

European Search Report for Application No. EP 14 88 3879.

* cited by examiner

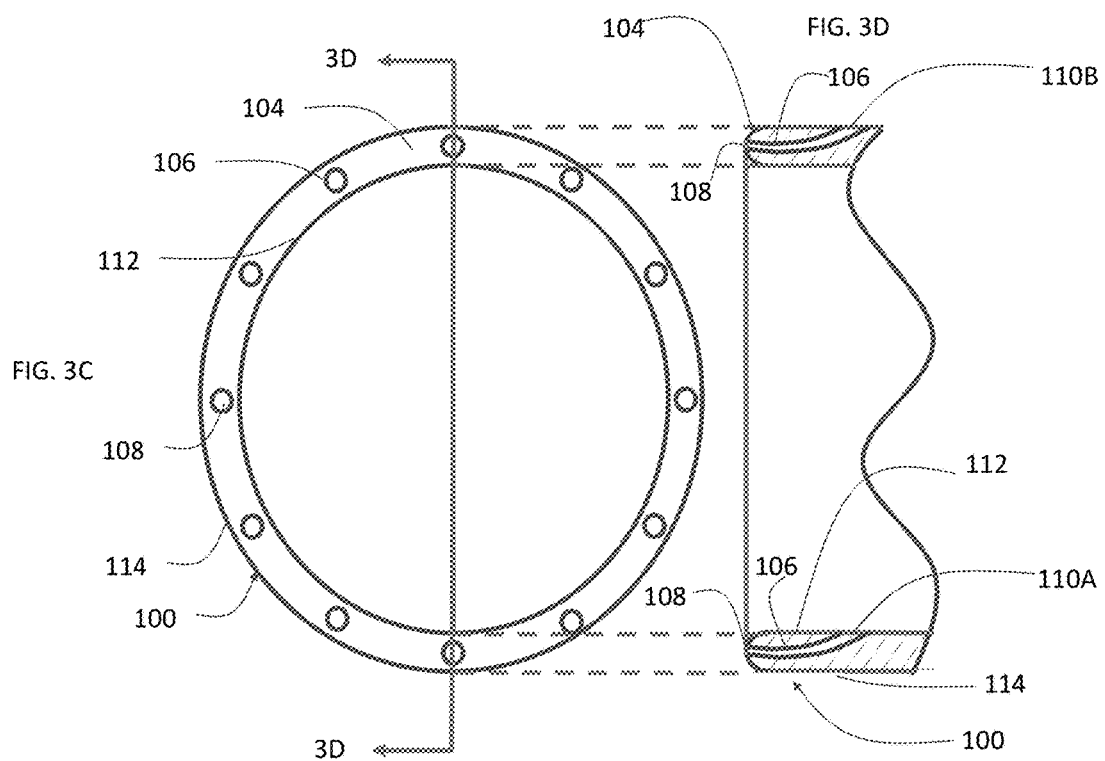

FAN NACELLE INLET FLOW CONTROL

RELATED APPLICATIONS

This application is a National Phase Application of Patent Application PCT/US2014/070039 filed on Dec. 12, 2014, which claims the benefit of and incorporates by reference herein the disclosure of U.S. Ser. No. 61/916,387, filed Dec. 16, 2013.

TECHNICAL FIELD OF THE DISCLOSURE

The present disclosure is generally related to gas turbine engines and, more specifically, to fan nacelle inlet flow control.

BACKGROUND OF THE DISCLOSURE

Gas turbine engines for commercial aircraft applications typically include an engine core housed within a core nacelle. In one type of arrangement known as a turbofan engine, the core drives a large fan upstream from the core that provides airflow into the core. A significant portion of airflow bypasses the core to provide thrust. One or more spools are arranged within the core, and a gear train may be provided between one of the spools and the fan. A fan case and fan nacelle surround the fan and at least a portion of the core.

A gas turbine propulsion systems includes a core engine that drives a fan. A fan nacelle surrounds the fan. The nacelle has a rounded forward construction often referred to as the inlet cowl. One surface of this cowl forms an inner surface of the cowl and additionally forms the outer perimeter of the engine flow stream into the downstream fan. A second surface of this cowl creates an outer surface forming the exterior of the nacelle. The two surfaces of the cowl are contiguous and connected through a rounded leading edge segment often referred to as an inlet lip. During engine operation, it is desired to have limited flow separation about this cowl and to the flow entering the engine. Flow separation occurs where airflow communicated through the inlet lip separates from an inner surface of the inlet lip portion. Flow separation can introduce flow distortion at the inlet that affects engine performance including efficiency and stall margin. Flow distortion at the exterior of the nacelle can promote drag and other undesirable impacts to the aircraft system as a whole.

Accordingly, it is desirable to improve the performance of a turbofan gas turbine engine by limiting flow separation at the fan nacelle.

SUMMARY OF THE DISCLOSURE

In one embodiment, a nacelle for use with a gas turbine engine including a fan is disclosed, the nacelle comprising: a nacelle inlet cowl including an inlet lip disposed at a leading edge of the nacelle inlet cowl, an inner surface extending aft from the inlet lip, and an outer surface extending aft from the inlet lip and positioned radially outward of the inner surface; and at least one flow control passage extending through the nacelle inlet cowl, each of the at least one flow control passage including a flow control passage inlet, disposed on the inlet lip, and a flow control passage outlet; wherein air may flow into the flow control passage inlet, through the flow control passage, and exits the flow control passage outlet.

In another embodiment, a gas turbine engine is disclosed, comprising in serial flow communication: a fan; a compressor; a combustor; and a turbine; and further comprising: a nacelle surrounding the fan, the nacelle including a nacelle inlet cowl including an inlet lip disposed at a leading edge of the nacelle inlet cowl, an inner surface extending aft from the inlet lip, and an outer surface extending aft from the inlet lip and positioned radially outward of the inner surface; and at least one flow control passage extending through the nacelle inlet cowl, each of the at least one flow control passage including a flow control passage inlet, disposed on the inlet lip, and a flow control passage outlet; wherein air may flow into the flow control passage inlet, through the flow control passage, and exits the flow control passage outlet.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 3C is a schematic front elevational view of the nacelle in an embodiment;

FIG. 3D is a schematic cross sectional view of the nacelle in an embodiment;

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
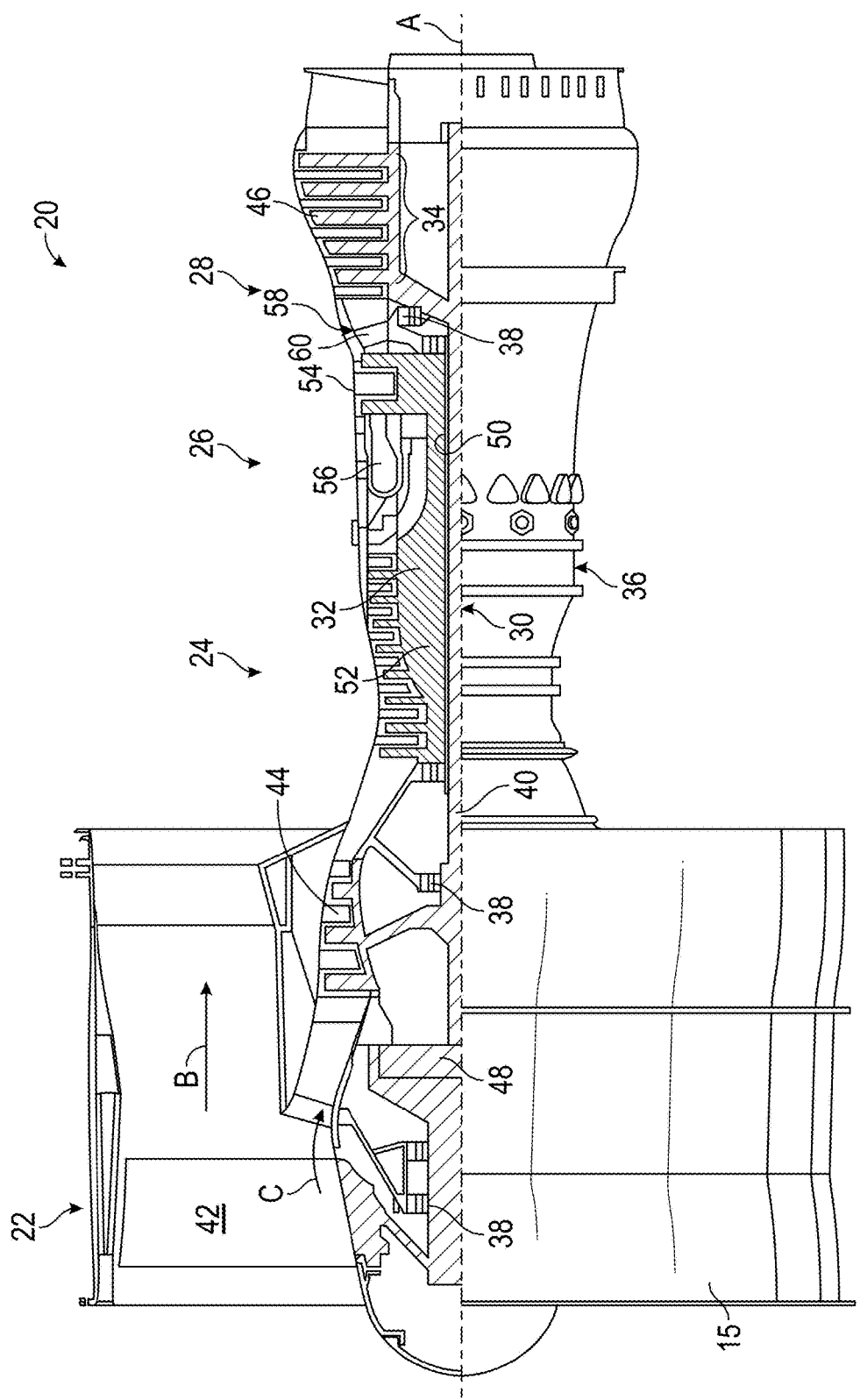
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° \ R)]^{0.5}$. The "Low corrected fan tip speed" as disclosed herein according to one non-limiting embodiment is less than about 1150 ft/second.

Figure 2:
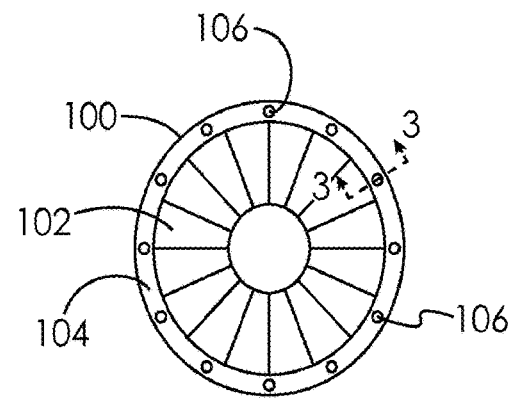
FIG. 2 is a schematic front elevational view of a fan and nacelle in an embodiment.
Figure 3A:
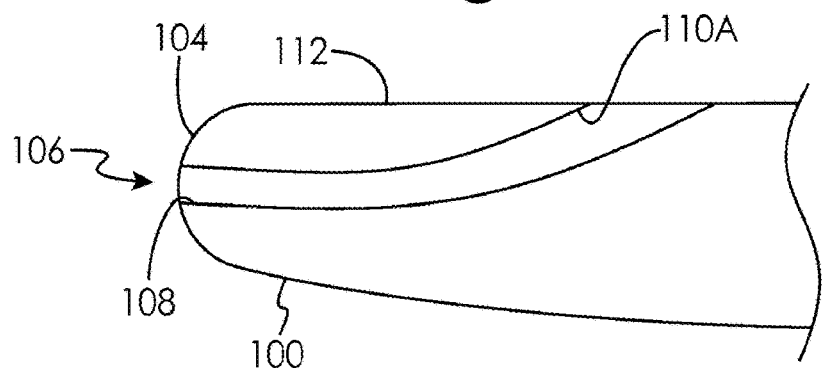
FIG. 3A is a schematic cross-sectional view of a fan nacelle in an embodiment.

FIG. 2 illustrates a nacelle inlet cowl 100 surrounding a fan 102 of a gas turbine engine in an embodiment. The inlet lip 104 of nacelle inlet cowl 100 includes one or more flow control passages 106 formed therein. As shown in cross-section in FIGS. 3A-B, the flow control passages 106 may be configured with an inlet 108 in the vicinity of the leading edges of the inlet lip 104. As shown in FIG. 3A, the flow control passage 106 then extends through the inlet cowl 100 and discharges at an outlet 110A forward of the engine fan 102 along the inner surface 112 of the inlet cowl 100 in an embodiment.

At low speed conditions such as during take-off, the flow exterior to the nacelle is low speed whereas, due to the rotating turbomachinery of the engine, flow is being pulled into inlet cowl 100 at higher velocities. The total pressure at the leading edge of the inlet lip 104 is therefore higher than the static pressure downstream within and outside the nacelle. The passive inlet flow control passage 106 assists by allowing the engine to suck in flow from the leading edge 104 of the inlet cowl 100 through the inlet 108 via the reduced pressure at the outlet 110A, thus orienting the stagnation point of the flow to the leading edge 104 and maintaining more "stable" flow to the engine about the nacelle. Siphoning flow into the inlet 108 ensures that the stagnation point is maintained at the same location and does not move around. Injecting air into the flow surrounding the outlet 110A can fill in voids in the flow caused by flow separation. In other words, the flow control passage 106 can reduce the size of the boundary layers, flow patterns and aerodynamic flow features that promote losses or distortion at the engine inlet. For instance, the passive flow control passages 106 can prevent flow separation at the inlet when the engine is exposed to a cross-flow. Cross-flow can limit engine operation due to stall considerations or undesirable performance at take-off.

Figure 3B:
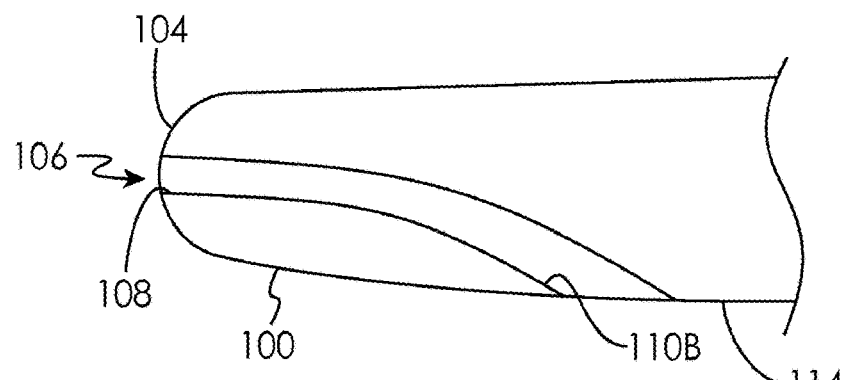
FIG. 3B is a schematic cross-sectional view of a fan nacelle in an embodiment.

Similarly, cross-flow can create drag on the nacelle that is undesired. As shown in FIG. 3B, if it is desired to use one or more flow control passages 106 to reduce propulsion system drag, the flow control passage 106 may extend through the inlet cowl 100 and discharge at an outlet 110B on the outer surface 114 of the inlet cowl 100 in an embodiment. In addition, as illustrated in FIGS. 3C-3D, in an embodiment at least one of the flow control passage outlets 110A is disposed on the inner surface 112 and at least one of the flow control passage outlets 110B is disposed on the outer surface 114. FIGS. 3C-3D are not intended to illustrate a required circumferential location of the different passage outlets 110A, 110B.

At high-speed conditions (e.g. cruise), the passive flow control passages 106 reduce sensitivity to inlet flow pattern variation and, thus, provide a better conditioned flow to the engine and reduced drag associated with the outboard surface 114 of the nacelle. Improvements of these types at cruise improve aircraft and engine fuel burn considerations.

Figure 4:
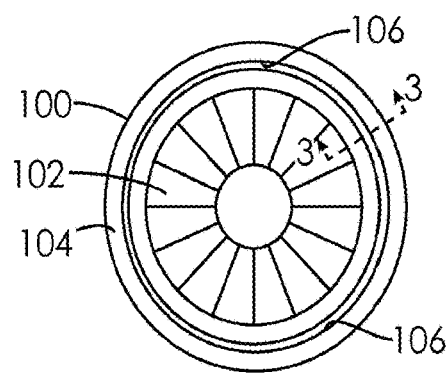
FIG. 4 is a schematic front elevational view of a fan and nacelle in an embodiment.

Any number of flow control passages 106 may be provided in the inlet cowl 100 as required to achieve the desired flow control. As illustrated in FIG. 2, multiple discrete flow control passages 106 having inlets 108 may be provided on the leading edge 104 of the inlet cowl 100 in an embodiment. In an embodiment, the discrete flow control passages may include a circular cross-section, although other embodiments may include differently shaped cross-sections. As illustrated in FIG. 4, the flow control passage 106 may be formed as a continuous passage extending 360 degrees around the inlet cowl 100, or a portion less than 360 degrees thereof, in an embodiment. In the embodiment of FIG. 4, the inlet 108 and outlet 110 is also formed as a continuous passage around the inlet cowl 100, or a portion thereof. Because the continuous flow control passage of FIG. 4 separates one section of the inlet cowl 100 from the remainder of the inlet cowl 100, appropriate structural members may be provided between the two portions of the inlet cowl 100 to maintain their relative positions.

Figure 5:
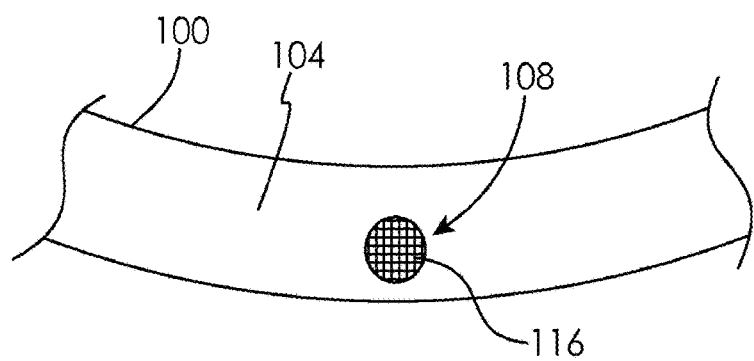
FIG. 5 is a schematic close-up front elevational view of a fan and nacelle in an embodiment.
Figure 6:
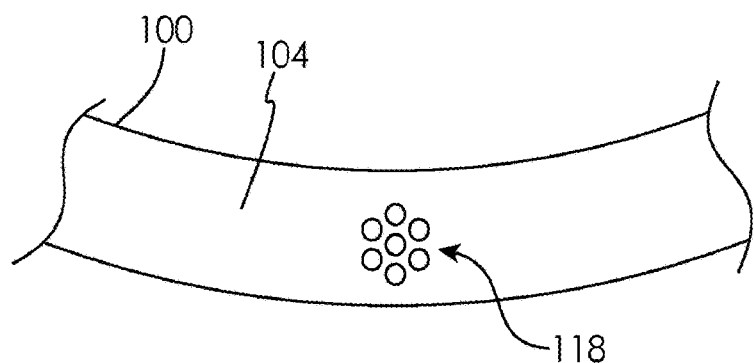
FIG. 6 is a schematic close-up front elevational view of a fan and nacelle in an embodiment.

The passive flow control passages 106 may be tailored to specific nacelle geometries, such as by segmenting, preferentially orienting and/or shaping the inlet 108, passage length or outlet 110. For instance, the nacelle may be shaped such that the cowl extends more forward at the upper portion under the wing than it does at the lower portion nearest the ground and landing gear, or the nacelle may have a so-called bell-mouth design. These designs may be more prone to non-uniform flow patterns about the inlet cowl 100. The flow control passages 106 may be tailored to these non-uniform flow patterns by providing different flow control passage 106 configurations at different locations in the inlet cowl 100. Also, due to foreign object damage, contact or ingestion, the flow control passage 106 inlets 108 and outlets 110 may be provided with screening, perforations or other shielding treatments. For example, as shown in FIG. 5, the flow control passage 106 inlet 108 may be covered with a screen 116 to minimize the possibility of foreign object ingestion in an embodiment. As shown in FIG. 6, the flow control passage 106 inlet may comprise a perforated area 118 in the leading edge 104 of the inlet cowl 100 in an embodiment. In order to prevent ice formation in and around flow control passage 106, de-icing apparatus may be provided adjacent to flow control passage 106 and/or inlet cowl 100, such as heaters, including pneumatic, fluidic or electrical heaters to name just a few non-limiting examples, or other means for de-icing these areas.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A nacelle for use with a gas turbine engine including a fan, the nacelle comprising:
   a nacelle inlet cowl including an inlet lip disposed at a leading edge of the nacelle inlet cowl, an inner surface extending aft from the inlet lip, and an outer surface extending aft from the inlet lip and positioned radially outward of the inner surface; and
   at least one flow control passage extending through the nacelle inlet cowl, each of the at least one flow control passage including a flow control passage inlet, disposed on the inlet lip, and a flow control passage outlet;
   wherein air may flow into the flow control passage inlet, through the flow control passage, and exits the flow control passage outlet, and
   wherein the at least one flow control passage comprises a plurality of flow control passages and at least one of the flow control passage outlets is disposed on the inner surface and at least one of the flow control passage outlets is disposed on the outer surface.

2. The nacelle of claim 1, wherein each of the at least one flow control passage inlets is disposed at a leading edge of the inlet lip.

3. The nacelle of claim 1, wherein each of the at least one flow control passage outlets is disposed on the inner surface.

4. The nacelle of claim 1, wherein each of the at least one flow control passage outlets is disposed forward of the fan when the nacelle is mounted on the gas turbine engine.

5. The nacelle of claim 1, wherein each of the at least one flow control passage outlets is disposed on the outer surface.

6. The nacelle of claim 1, wherein the at least one flow control passage comprises a single continuous flow control passage extending 360 degrees around the inlet cowl.

7. The nacelle of claim 1, wherein each of the at least one flow control passage inlets and outlets includes a screen disposed thereon.

8. The nacelle of claim 1, wherein each of the at least one flow control passage inlets comprises a perforation of the inlet lip and each of the at least one flow control passage outlets comprises a perforation of the inner surface.

9. The nacelle of claim 1, further comprising a de-icing apparatus disposed adjacent at least one of the at least one flow control passage or the nacelle inlet cowl.

10. A gas turbine engine comprising in serial flow communication: a fan;
    a compressor;
    a combustor; and
    a turbine; and further comprising:
    a nacelle surrounding the fan, the nacelle including a nacelle inlet cowl including an inlet lip disposed at a leading edge of the nacelle inlet cowl, an inner surface extending aft from the inlet lip, and an outer surface extending aft from the inlet lip and positioned radially outward of the inner surface; and
    at least one flow control passage extending through the nacelle inlet cowl, each of the at least one flow control passage including a flow control passage inlet, disposed on the inlet lip, and a flow control passage outlet;
    wherein air may flow into the flow control passage inlet, through the flow control passage, and exits the flow control passage outlet, and
    wherein the at least one flow control passage comprises a plurality of flow control passages and at least one of the flow control passage outlets is disposed on the inner surface and at least one of the flow control passage outlets is disposed on the outer surface.

11. The gas turbine engine of claim 10, wherein each of the at least one flow control passage inlets is disposed at a leading edge of the inlet lip.

12. The gas turbine engine of claim 10, wherein each of the at least one flow control passage outlets is disposed on the inner surface.

13. The gas turbine engine of claim 10, wherein each of the at least one flow control passage outlets is disposed forward of the fan.

14. The gas turbine engine of claim 10, wherein each of the at least one flow control passage outlets is disposed on the outer surface.

15. The gas turbine engine of claim 10, wherein the at least one flow control passage comprises a single continuous flow control passage extending 360 degrees around the inlet cowl.

16. The gas turbine engine of claim 10, wherein each of the at least one flow control passage inlets and outlets includes a screen disposed thereon.

17. The gas turbine engine of claim 10, wherein each of the at least one flow control passage inlets comprises a perforation of the inlet lip and each of the at least one flow control passage outlets comprises a perforation of the inner surface.

18. The gas turbine engine of claim 10, further comprising a de-icing apparatus disposed adjacent at least one of the at least one flow control passage or the nacelle inlet cowl.

* * * * *